United States Patent [19]

Horsley

[11] Patent Number: 5,211,478
[45] Date of Patent: May 18, 1993

[54] HOUSING FOR TEMPERATURE MEASURING APPARATUS

[75] Inventor: John Horsley, Derby, England

[73] Assignee: Rolls-Royce plc, London, England

[21] Appl. No.: 795,377

[22] Filed: Nov. 21, 1991

[30] Foreign Application Priority Data

Dec. 14, 1990 [GB] United Kingdom ............... 9027169.3

[51] Int. Cl.[5] ............................................... G01J 5/02
[52] U.S. Cl. .................................. 374/125; 374/144; 374/208
[58] Field of Search ............... 374/121, 130, 131, 125, 374/135, 144, 208; 350/584; 356/43

[56] References Cited

U.S. PATENT DOCUMENTS

| | | | |
|---|---|---|---|
| 1,318,516 | 10/1919 | Wallis et al. | 374/125 |
| 3,584,509 | 6/1971 | Comptor et al. | 374/144 |
| 4,650,318 | 3/1987 | Pointer et al. | 374/125 |
| 4,657,385 | 4/1987 | Pointer | 374/130 |
| 4,738,528 | 4/1988 | Craft | 374/125 |
| 4,786,188 | 11/1988 | Myhre | 374/125 |
| 4,836,689 | 6/1989 | O'Brien et al. | 374/125 |
| 4,986,672 | 1/1991 | Beynon | 374/130 |

FOREIGN PATENT DOCUMENTS 1185956  2/1968  United Kingdom .
8705390  9/1987  World Int. Prop. O. .
911694   8/1991  World Int. Prop. O. .

Primary Examiner—William A. Cuchlinski, Jr.
Assistant Examiner—G. Bradley Bennett
Attorney, Agent, or Firm—Cushman, Darby & Cushman

[57] ABSTRACT

A light guide has a window through which radiation passes to a detector. The light guide is provided with a housing which defines a duct through which a flow of cooling fluid passes. The duct is arranged so that a proportion of the fluid flow passes over the external surface of the window to prevent deposition of contaminants thereon. A circumferential shield extends around the window to control the flow of radiation therethrough. The circumferential shield has a curved radial recess therein which imparts a rotational component of velocity to the flow of fluid passing over the surface of the window to promote cooling of the shield. The shield is further provided with an annular internal step which prevents radiation reflected from the inner wall of the shield passing through the shield.

8 Claims, 1 Drawing Sheet

HOUSING FOR TEMPERATURE MEASURING APPARATUS

BACKGROUND OF THE INVENTION

1. Field of the Invention

The present invention relates to a housing for temperature measuring apparatus and in particular to a housing for a pyrometer used for measuring the temperature of components in hostile environments.

2. Description of Related Art

It is known to use pyrometers to measure the temperature of rotors in gas turbine engines. The temperature of the blades of the rotor can be measured by mounting the pyrometers through apertures in the engine casing. The pyrometers consist of a lens which focuses radiation emitted from the blade of the rotor onto a radiation sensor. The radiation is focused either directly onto the radiation sensor or via a radiation guide such as a fibre optic cable. The pyrometers experience high temperatures when mounted on the engine casing and contaminants such as soot or other combustion products from the engine are deposited onto the external surface of the lens. These contaminants build up reducing the amount of radiation transmitted to the sensor. The pyrometers are also susceptible to spurious measurements caused by stray radiation being reflected from the engine casing.

Pyrometers working in such hostile environments are provided with housings which permit a flow of fluid over the external surface of the pyrometers to keep it cool. A cooling fluid, such as air, passes over the external surface of the pyrometer after which it is ducted externally of the housing and vented safely away. A proportion of the cooling fluid is however ducted over the external surface of the lens to purge it and reduce the amount of contaminants that are deposited onto the lens. The flow of purging air over the lens exhausts into the vicinity of the test target such as the rotating blades of a gas turbine. The purge air adversely affects the test environment and should the purge air impact the blades an accurate measurement of their temperature is difficult to achieve.

SUMMARY OF THE INVENTION

The present invention seeks to provide a housing for temperature measuring apparatus, such as a pyrometer, which reduces the amount of stray radiation entering therein and reduces the adverse effect of the purge air on the test environment.

According to the present invention a housing for temperature measuring apparatus comprises a duct surrounding the temperature measuring apparatus so as to define a space therebetween for the passage of a fluid, the duct extending between an at least one window at one end of the temperature measuring apparatus and a detector at the other end of the temperature measuring apparatus, the duct being arranged so that a proportion of the fluid flow passing therethrough flows over an external surface of the at least one window, the external surface of the at least one window being further provided with a circumferential shield, the circumferential shield having a radial recess adjacent the window to impart a rotational component of velocity to the flow of fluid passing over the external surface of the window to provide cooling of the shield., the circumferential shield being further provided with an at least one internal annular step to control flow of radiant energy therethrough.

Preferably the at least one window is a lens which focuses the radiant energy onto the detector of the temperature measuring apparatus.

The radial recess in the circumferential shield is preferably curved and the circumferential shield may further be provided with rounded internal corners.

BRIEF DESCRIPTION OF THE DRAWINGS

The present invention will now be described by way of example and with reference to the accompanying drawings in which.

DETAILED DESCRIPTION OF THE PREFERRED EMBODIMENTS

Figure 1:
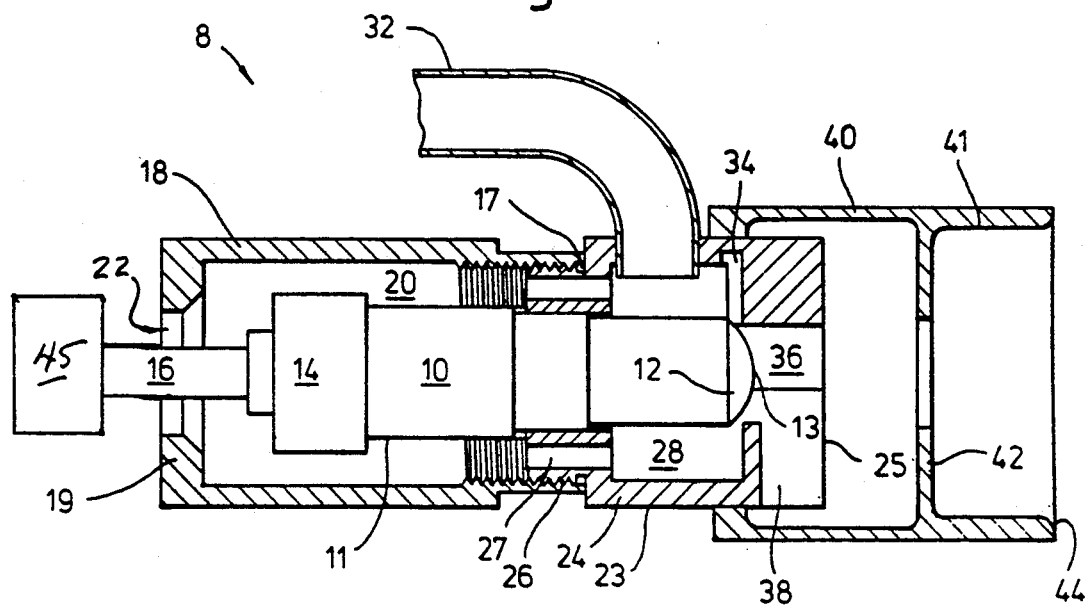
FIG. 1 is a cross-sectional view of a pyrometer housing in accordance with the present invention.

Referring to FIG. 1, an infra-red pyrometer, generally indicated at 8, comprises a light guide 10 which has a window 12. A junction 14 connects the light guide 10 to a fibre optic cable 16. The light guide 10 is provided with a housing 18 which is concentric therewith to define a duct 20 around the light guide 10. The fibre optic cable 16 extends through an aperture 22 in the rear 19 of the housing 18 to connect the light guide 10 to a detector 45.

Figure 2:
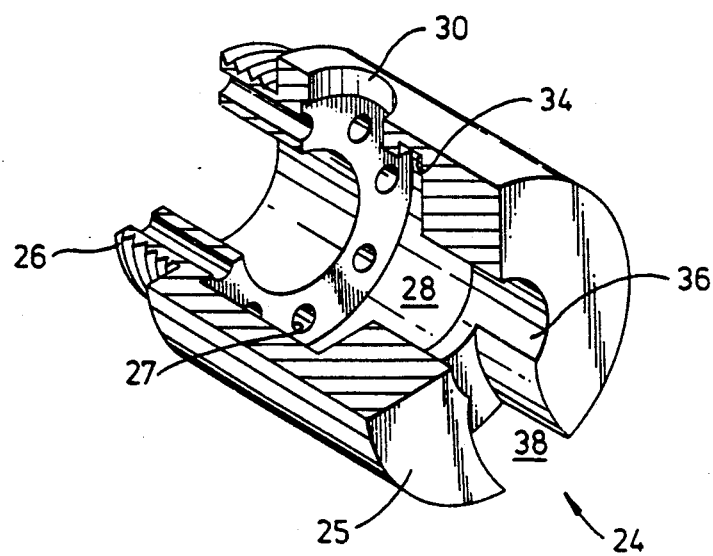
FIG. 2 is a partially cut away pictorial view of part of a pyrometer housing in accordance with the present invention.

A boss 24, shown more clearly in FIG. 2, is engaged by a screw thread 26 to the front 17 of the housing 18. The boss 24 extends around the window 12 of the light guide 10 and is provided with a plurality of channels 27 which interconnect an annular chamber 28 in the boss 24 to the duct 20. The annular chamber 28 in the boss 24 is provided with an aperture 30 through which is inserted a tube 32 which extends externally of the housing 18. The boss 24 is further provided with a recess 34 which connects the annular chamber 28 in the boss 24 to the external surface 13 of the window 12 of the light guide 10. The front face 25 of the boss 24 has a cylindrical aperture 36 therein which is aligned with the window 12 of the light guide 10 to allow radiation to pass therethrough. The front face 25 of the boss 24 is further provided with a curved radial recess 38 adjacent the window 12 of the light guide 10.

Attached to the periphery 23 of the boss 24 is a cylindrical sleeve 40. The cylindrical sleeve 40 has an internal annular step 42 therein which is of larger diameter than the aperture 36 in the front face 25 of the boss 24.

In operation the light guide 10 and its associated housing 18 are mounted in a hostile environment, such as the engine casing of a gas turbine engine. The fibre optic cable 16 connects the light guide 10 to a detector (not shown) which is remotely located from the engine casing. The light guide 10 is mounted so that a rotor of the gas turbine engine which is under investigation is in the line of sight of the window 12 of the light guide 10.

Infra-red radiation emitted from the rotor under investigation, passes through the cylindrical sleeve 40. The amount of radiation that passes through the sleeve 40 is controlled by the internal annular step 42 therein. The internal annular step 42 prevents radiation reflected from the inner wall 41 of the sleeve 40 passing to the aperture 36 in the front face 25 of the boss 24. This reduces the likelihood of spurious temperature measurements which result from the radiation reflected from the inner wall 41 of the sleeve 40. The infra-red radiation permitted through the sleeve 40 passes through the aperture 36 in the boss 24 to the window 12 of the light guide 10. In the preferred embodiment of the present invention the window 12 is configured to act as a lens which focuses the radiation passing therethrough into the fibre optic cable 16 which transmits it to the detector 45.

Deposition of contaminants, such as soot or other combustion products from the gas turbine engine, onto the lens 12 is prevented by allowing a proportion of a flow of fluid, which is used to keep the light guide cool, to flow over the surface 13 of the window 12. A flow of cooling fluid, such as air, is supplied to the duct 20 through aperture 22 in the rear 19 of the housing 18 through which the fibre optic cable 16 passes. The air passes through the duct 20 to cool the external surface 11 of the light guide 10. The cooling air then passes from the duct 20 through the channels 27 in the boss 24 to the annular chamber 28. The majority of the cooling air then passes from the annular chamber 28 through the aperture 30 to be directed by the tube 32 externally of the housing 18. The cooling air in the tube 32 may then be vented safely away or cooled and recirculated through the duct 20.

A small proportion of the cooling air is directed by the recess 34 from the annular, chamber 28 to flow over the external surface 13 of the window 12. This flow of cooling air acts to purge the window 12 keeping it clean and preventing deposition of contaminants onto the surface 13. After purging the window 12 the purge air interacts with the radial recess 38 in the front face 25 of the boss 24. The radial recess 38 is curved to impart a rotational component of velocity to the purge air. The purge air swirls and is encouraged to adhere to the inner surface 41 of the cylindrical sleeve 40. The purge air acts to cool the cylindrical sleeve 40 so further reducing the likelihood of spurious temperature measurements which result from radiation being reflected from the inner wall 41 of the sleeve 40.

In cooling the cylindrical sleeve 40 the purge air is heated. The warm purge air exhausts into the vicinity of the rotor under investigation. Should the warm purge air impact the rotor under investigation its cooling effect is substantially reduced and its effect on the temperature of the rotor will be negligible.

In the preferred embodiment of the present invention the cylindrical sleeve 40 is provided with rounded internal corners 44. The rounded internal corners 44 reduce the likelihood of radiation being reflected within the sleeve and further act to diffuse the purge air exhausting from the sleeve 40 away from the rotor under investigation.

It will be appreciated by one skilled in the art that although the present invention has been described with reference to a pyrometer it is equally applicable to any temperature measuring apparatus where shielding is necessary from stray radiation.

I claim:

1. A housing for a temperature measuring apparatus having at least one window, the at least one window having an external surface, comprising:
    a duct surrounding the temperature measuring apparatus so as to define a space therebetween for passage of a flow of fluid, the duct being arranged so that a portion of the fluid flow passing therethrough flows over the external surface of the at least one window;
    a circumferential shield located adjacent the external surface of the at least one window, the circumferential shield including a cylindrical section having an internal surface, said cylindrical section having at least one internal annular step disposed between the at least one window and the internal surface of the cylindrical section to prevent radiant energy reflected from the internal surface of the cylindrical section from passing through the at least one window, said circumferential shield having a radial recess adjacent to the at least one window to impart a rotational component of velocity to the flow of fluid which passes over the external surface of the at least one window and to direct the flow of fluid radially outward to promote cooling of the circumferential shield.

2. A housing as claimed in claim 6 in which the at least one window is a lens which focuses the radiant energy onto a detector.

3. A housing as claimed in claim 6 in which the radial recess in the circumferential shield is curved.

4. A housing as claimed in claim 6 in which the circumferential shield has rounded internal corners to minimise reflection or radiant energy passing therethrough and to diffuse the flow of fluid passing over the external surface of the at least one window as its exhausts from the circumferential shield.

5. A housing as claimed in claim 6 wherein the temperature measuring apparatus is a pyrometer.

6. A housing as claimed in claim 1, further comprising:
    an introduction aperture through which the flow of fluid is introduced into the housing; and
    an escape aperture through which the flow of fluid exits the housing.

7. A housing as claimed in claim 2, further comprising:
    a fiber optical cable for communicating the radiant energy passing through the at least one window to the detector.

8. A housing for a temperature measuring apparatus having at least a window, the at least one window having an external surface, comprising:
    a boss extending around the at least one window; and
    a circumferential shield having a cylindrical section, the cylindrical section having an internal surface, the circumferential shield having at least one internal annular step to prevent radiant energy reflected from the internal surface of the cylindrical section from passing through the at least one window and having a radial recess adjacent to the at least one window to impart a rotational component of velocity to the flow of fluid which passes over the external surface of the at least one window and to direct the flow of fluid radially outward to promote cooling of the circumferential shield;
    wherein the internal surface and the boss form a duct surrounding the temperature measuring apparatus, the duct defining a space for the passage of a flow of fluid and being arranged so that a portion of the fluid flow passing therethrough flows over the external surface of the at least one window.

* * * * *